United States Patent
Prasad et al.

(10) Patent No.: US 6,788,728 B1
(45) Date of Patent: Sep. 7, 2004

(54) SYSTEM AND METHOD FOR REDUCING PEAK-TO-AVERAGE RATIO OF THE REVERSE LINK MODULATOR IN A CDMA PHONE SYSTEM

(75) Inventors: Mohit K. Prasad, San Diego, CA (US); Sam Heidari, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/478,265

(22) Filed: Jan. 5, 2000

Related U.S. Application Data
(60) Provisional application No. 60/115,629, filed on Jan. 12, 1999.

(51) Int. Cl.[7] ............................ H04B 1/713; H04J 11/00
(52) U.S. Cl. ...................................... 375/130; 375/140
(58) Field of Search .............................. 375/295, 130, 375/206, 308; 370/210–479

(56) References Cited

U.S. PATENT DOCUMENTS

| | | | | |
|---|---|---|---|---|
| 5,222,104 A | * | 6/1993 | Medendorp | 375/308 |
| 5,511,073 A | * | 4/1996 | Padovani et al. | 370/471 |
| 5,642,384 A | * | 6/1997 | Ramesh | 375/265 |
| 5,659,569 A | * | 8/1997 | Padovani et al. | 370/479 |
| 5,745,527 A | * | 4/1998 | Kelton et al. | 375/308 |
| 5,796,784 A | * | 8/1998 | LoGalbo et al. | 375/298 |
| 5,956,328 A | * | 9/1999 | Sato | 370/335 |
| 6,031,865 A | * | 2/2000 | Kelton et al. | 375/130 |
| 6,081,502 A | * | 6/2000 | Paneth et al. | 370/210 |
| 6,246,697 B1 | * | 6/2001 | Whinnett et al. | 370/479 |
| 6,389,138 B1 | * | 5/2002 | Li et al. | 380/35 |
| 2002/0176480 A1 | * | 11/2002 | Wheatley et al. | 375/130 |

FOREIGN PATENT DOCUMENTS

| | | | |
|---|---|---|---|
| EP | 0 783 210 A2 | 7/1997 | H04B/1/707 |
| EP | 0 921 652 A2 | 6/1999 | H04J/13/04 |
| WO | WO 99/07089 | 2/1999 | H04B/15/00 |

OTHER PUBLICATIONS

Kashyap et al.: "The Performance of CDMA System Using π/4–Shift QPSK and π/2–Shift BPSK with the Nonlinearity of HPA" IEEE International Symposium on Personal, Indoor and Mobile Radio Communications, Oct. 15–18, 1996, pp. 492–496, XP002137277, New York, USA, IEEE, US ISBN: 0–7803–3692–5.

* cited by examiner

*Primary Examiner*—Stephen Chin
*Assistant Examiner*—Lawrence Williams
(74) *Attorney, Agent, or Firm*—Mayer Fortkort & Williams, PC; Karin L. Williams, Esq.

(57) ABSTRACT

A reverse link modulator modulates the incoming data sequence for the I and Q channels of a wireless device such that the resulting spreading sequence never undergoes a transition through the origin. Consequently, the modulator has a reduced peak-to-average ratio and provides an improved battery life.

15 Claims, 4 Drawing Sheets

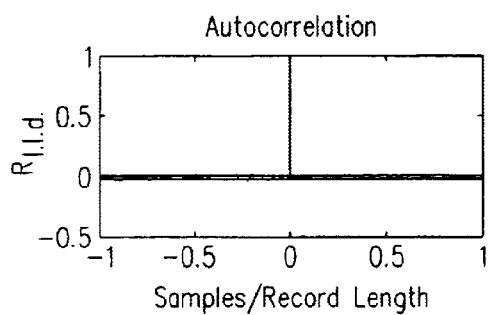
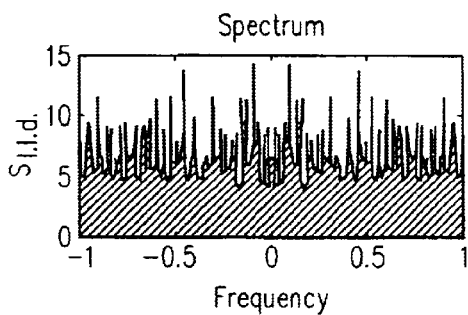
FIG. 4A
PRIOR ART
FIG. 4B
PRIOR ART
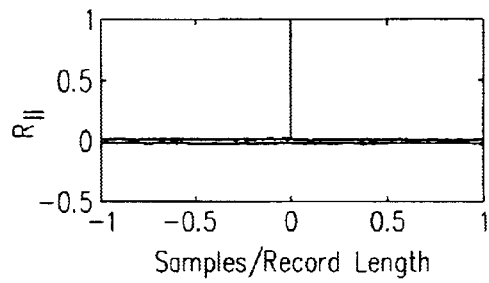
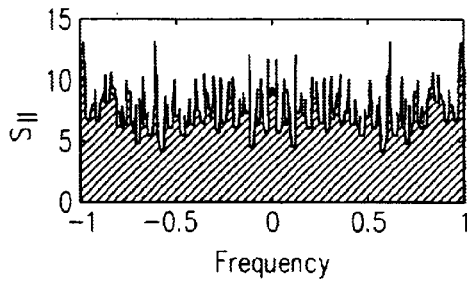
FIG. 5A
FIG. 5B
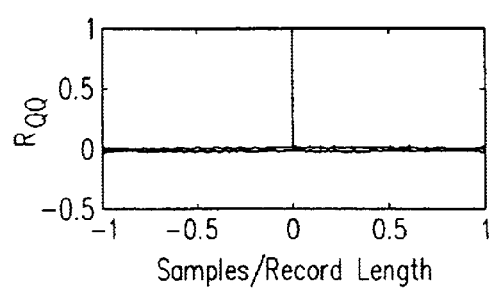
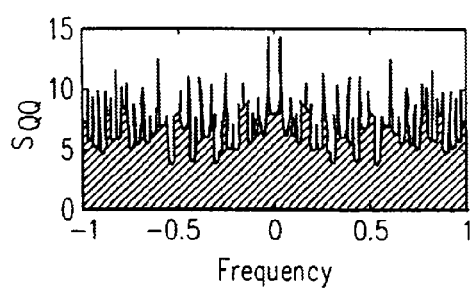
FIG. 6A
FIG. 6B
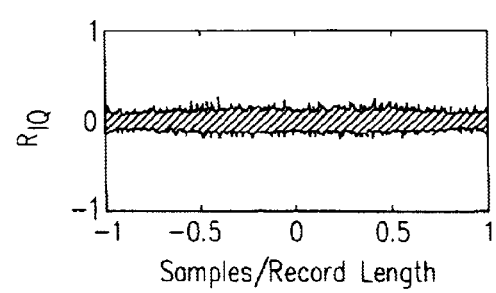
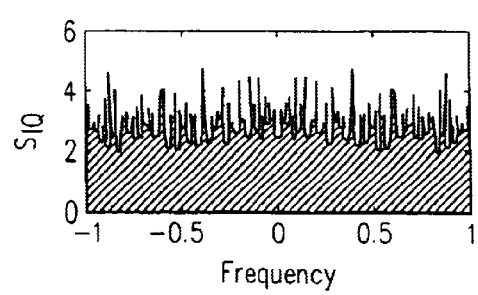
FIG. 7A
FIG. 7B

SYSTEM AND METHOD FOR REDUCING PEAK-TO-AVERAGE RATIO OF THE REVERSE LINK MODULATOR IN A CDMA PHONE SYSTEM

RELATED APPLICATION

Provisional patent application No. 60/115,629 was filed with the United States Patent and Trademark Office on Jan. 12, 1999 and is incorporated herein by reference in its entirety.

FIELD OF INVENTION

The present invention relates to generation of pseudo random sequences and, more particularly, to generation of pseudo random sequences in a reverse link modulator.

BACKGROUND OF THE INVENTION

Many electronic systems, such as wireless communication systems, use the Quaternary Phase Shift Keying (QPSK) technique to modulate and demodulate incoming binary input data stream.

FIG. 1 illustrates the four phases I, Q, $\bar{I}$ and $\bar{Q}$, forming the I-Q plane of a data channel. The QPSK technique uses these four phases to convert the random binary incoming data into a noise-like waveform by modulating the incoming data using a pseudo random sequence of bits. The modulation is carried out at the clock period of the pseudo random sequence generator.

As shown in FIG. 1, the four phases I, Q, $\bar{I}$ and $\bar{Q}$ have respective phase differences of 0°, 90°, 180°, and 270° with respect to the I-axis. Data coming through the I and Q channels of a reverse link modulator are identified by their positions along the I-Q plane. Furthermore, as shown in FIG. 1, such data may only assume positions at points A, B, C and D, which are respectively located along 45°, 135°, 225° and 315° of the I-axis of the I-Q plane.

Points A, B, C and D, have respective coordinates of (1, 1), (1, −1), (−1, 1) and (−1, −1), which are the only coordinates in the I-Q plane in which incoming data may reside.

Currently known systems do not impose restrictions on data transitions along the I-Q plane. Hence, a transition from, for example, point A to point C, in which both the I and Q coordinates of the data change, is allowed. Such a transition requires passing through the center of the I-Q plane and thus results in modulation of the carrier signal amplitude through a zero value, also referred to as zero crossing.

The greater the number of zero crossings, the higher is the degree of modulation of the carrier signal amplitude and the larger is the variation in the peak-to-average signal ratio. The large variation in the peak-to-average ratio, results in the relatively smaller battery life of the existing wireless devices (e.g. cellular telephones).

Therefore, a need continues to exist for a QPSK technique that has a reduced average-to-peak ratio and accordingly provides improved battery life.

SUMMARY OF THE INVENTION

A reverse link modulator, in accordance with one embodiment of the present invention, includes, among other components, a random sequence generator for generating a sequence of random pair of bits to modulate the incoming data bits. With each period of the pseudo random sequence generator clock, one bit of the pair of random bits changes.

The reverse link modulator also includes a long code mask, a long code generator, a complex multiplier and a pair of pulse shaping low-pass filters.

In some embodiments, the random sequence generator is a 2-bit state machine having four states (00), (01), (10), (11). The output signals generated by the state machine are the same as its states. Only transitions changing one bit of the 2-bit states are allowed.

The reverse link modulator, in accordance with the present invention, inhibits zero transitions of the spreading sequence. Therefore, the reverse link modulator has a suppressed carrier signal amplitude modulation and a reduced peak-to-average signal ratio.

BRIEF DESCRIPTION OF THE DRAWINGS

FIGS. 4A and 4B respectively illustrate the autocorrelation and the Fourier transform of a sequence of a random reference signal.

FIGS. 5A and 5B respectively illustrate the autocorrelation and the Fourier transform of a sequence of random bits PNI(n) generated by the constellation sequence generator, in accordance with the present invention.

FIGS. 6A and 6B respectively illustrate the autocorrelation and the Fourier transform of a sequence of random bits PNQ(n) generated by the constellation sequence generator, in accordance with the present invention.

FIGS. 7A and 7B respectively illustrate the crosscorrelation and the Fourier transform of a sequence of random bits PNI(n) and PNQ(n) generated by the constellation sequence generator, in accordance with the present invention.

DETAILED DESCRIPTION

Figure 1:
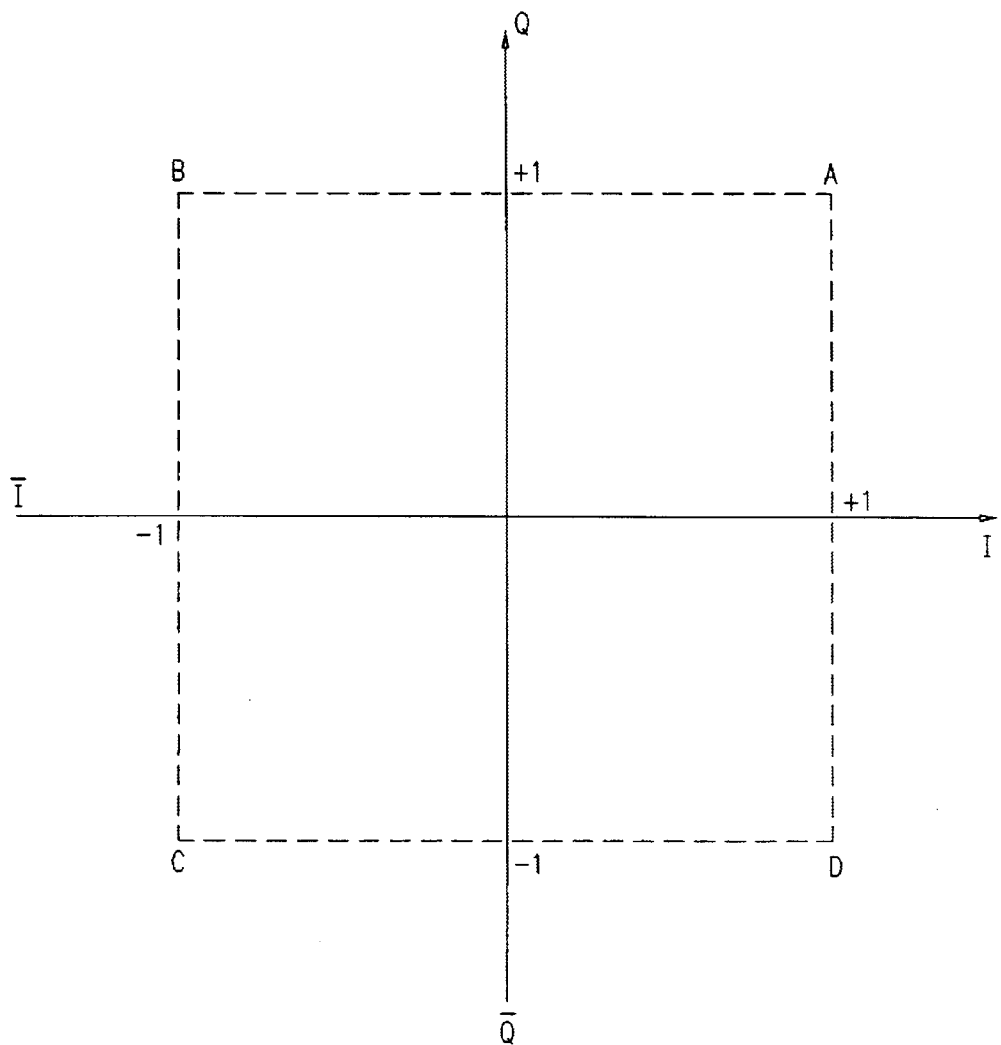
FIG. 1 illustrates the four phases I, Q, $\bar{I}$ and $\bar{Q}$ which form the I-Q plane of a data channel, as known in the prior art.
Figure 2:
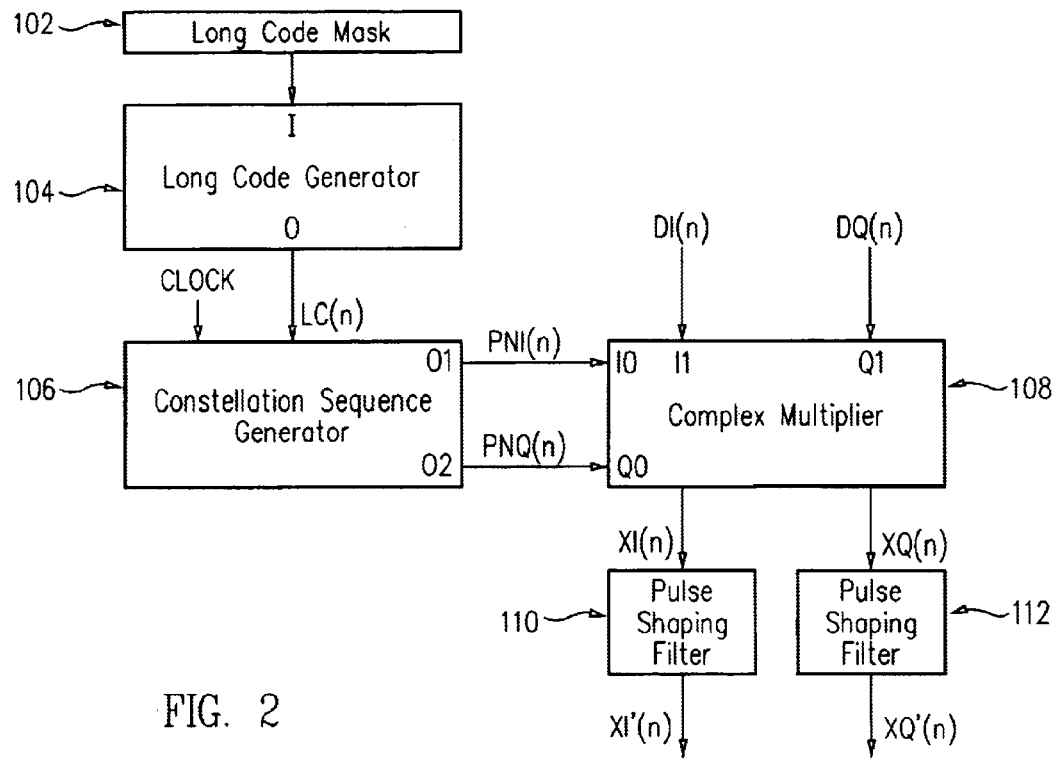
FIG. 2 is a block diagram of a reverse link modulator having a reduced peak-to-average ratio, in accordance with one embodiment of the present invention.

A reverse link modulator 100 having a reduced peak-to-average ratio, in accordance with one embodiment of the present invention, is shown in FIG. 2. Reverse link modulator 100 includes long code mask 102, long code generator 104, constellation sequence generator 106, complex multiplier 108 and pulse shaping low-pass filters 110 and 112.

Long code mask 102 is known in the art and contains a 42-bit wide data. Each reverse link modulator 100 contains a unique 42-bit data in its long code mask 102. Accordingly, the data in long code mask 102 serves as the identifier of the reverse link modulator 100. Because the reverse link modulator 100 is embedded in a wireless hand-held device, such as a wireless telephone, the 42-bit data in the long code mask is a tag, differentiating one wireless device from all the others in use.

Long code generator 104 is also known in the art (see "*Introduction to Spread Spectrum Communication*" by R. L.

Peterson, R. E. Ziemer and D. E. Borth, 1995, Prentice Hall). Long code generator 104 receives the 42-bit wide data supplied by long code mask 102 at its input terminal I and generates random bits LC(n) at its output terminal O.

Constellation sequence generator 106, in accordance with the present invention, receives random bits LC(n) (supplied by long code generator 104) as well as signal CLOCK and, in response, generates a pair of random and uncorrelated sequence of bits PIN(n) and PNQ(n) at its output terminals O1 and O2, as described below.

Complex multiplier 108, known in the art, receives incoming binary data DI(n) and DQ(n) (respectively from I and Q data channels) at its respective terminals I1 and Q1. Data input bits DI(n) and DQ(n) are the real and imaginary parts of a complex data. Similarly, PNI(n) and PNQ(n) are the real and imaginary parts of the complex random signal. Accordingly, complex multiplier 108 multiplies the complex data with complex random signal to generate real and imaginary parts of the modulated data XI(n) and XQ(n), respectively.

Modulated data bits XI(n) and XQ(n) are supplied to known pulse shaping low-pass filters 110 and 112, which filter out the low frequency signals to generate signals XI'(n) and XQ'(n). The operation of constellation sequence generator 106 is described next.

Figure 3:
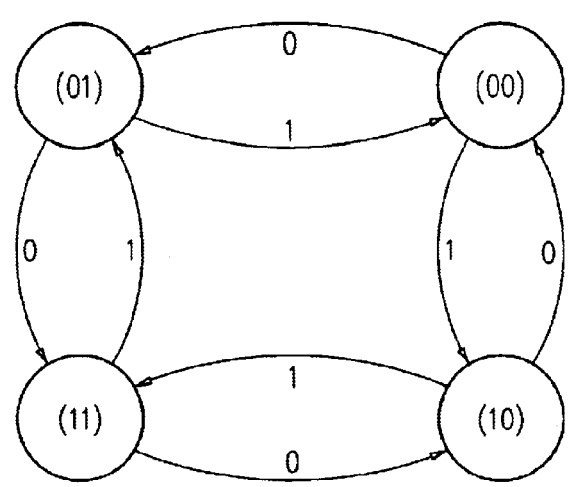
FIG. 3 illustrates the state transition diagram of the constellation sequence generator of the reverse link modulator of FIG. 2.
Figure 9:
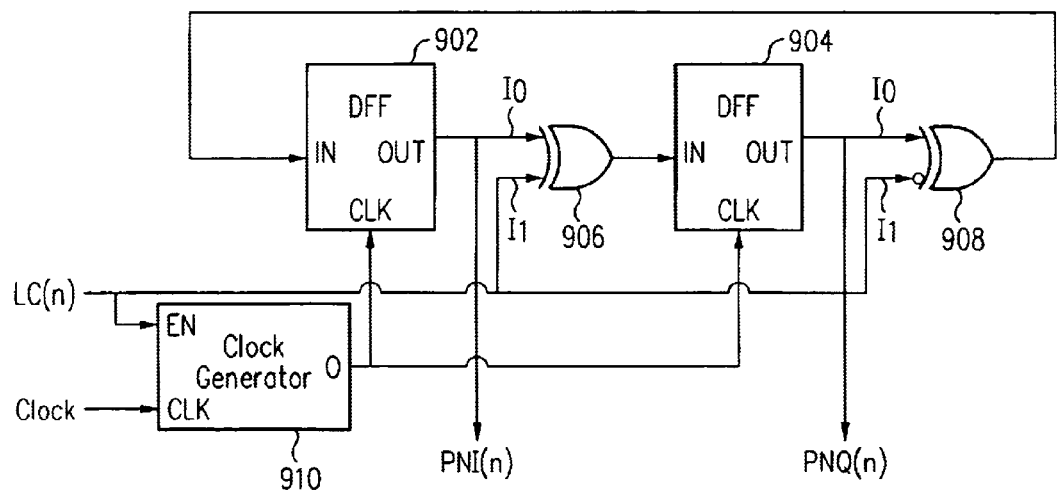
FIG. 9 illustrates one embodiment of a state machine of the constellation sequence generator whose state transition diagram is shown in FIG. 3.

Concurrent references are made below to FIGS. 2, 3 and 4A and 4B. Constellation sequence generator 106 is a state machine whose state transition diagram 200 is illustrated in FIG. 3. An embodiment 900 of the state machine of the constellation sequence generator 106 is shown in FIG. 9 of the drawings. Random bits 0 and 1 carried by signal LC(n) of long code generator 104 are the only bits (signals) supplied to state machine 900. The state machine 900 has four two-bit states: (00), (01), (10) and (11). The states of state machine 900 are also its output signals. In other words, the states of state machine 900 are bits PNI(n) and PNQ(n) supplied to output terminals 01 and 02 of constellation sequence generator 106, as shown in FIG. 2.

As seen in FIG. 3, starting from state (00), if the input signal bit to the state machine is a binary 0, a transition to state (01) takes place and, accordingly, signal bits PNI(n) and PNQ(n) are respectively set to 0 and 1. If, on the other hand, the state machine receives a binary 1 while in state (00), a transition to state (10) takes place, thereby setting signal bits PNP(n) and PNI(n) to 0 and 1, respectively.

If while in state (01), the state machine receives a 0, it transitions to state (11) and sets both signal bits PNQ(n) and PNI(n) to 0. If while in state (01), the state machine receives a 0, it transitions to state (00) and sets both signal bits PNI(n) and PNQ(n) to 0.

If while is state (10), the state machine receives a 0, it transitions to state (00) and sets both signal bits PNI(n) and PNQ(n) to 0. If while in state (10), the state machine receives a 1, it transitions to state (11) and sets signal bits PNI(n) and PNQ(n) to 1 and 1, respectively.

If while in state (11), the state machine receives a 0, it transitions to state (10) and sets signal bits PNI(n) and PNQ(n) to 1 and 0, respectively. If while in state (11), the state machine receives a 1, it transitions to state (01) and sets signal bits PNI(n) and PNQ(n) to 0 and 1, respectively.

Advantageously, in accordance with the present invention, output signal bits PNI(n) and PNQ(n) are random and uncorrelated. Also, as seen from FIG. 3, state transitions are restricted to those involving only one bit of the two-bit states. For example, only transitions to states (01) and (10) are allowed from state (00). Therefore, a transition from e.g. state (00) to state (11) and from state (01) to state (10) are prohibited. The restriction ensures that in moving from one state to another state, one of the random signals PNI(n) and PNQ(n) remains unchanged.

Because constellation sequence generator 106 eliminates all zero crossings in the sequence of pseudo random bits (i.e., the spreading sequence) by inhibiting state transitions which require zero crossings, constellation sequence generator 106, in accordance with one embodiment of the present invention, limits the modulation of the carrier signal amplitude and, as such, reduces the peak-to-average ratio of the modulated signals XI'(n) and XQ'(n).

FIGS. 4A, 4B, 5A, 5B, 6A and 6B respectively illustrate the auto-correlation function and the Fourier transform of a sequence of random reference bits, as well as a sequence of random bits PNI(n) and PNQ(n) generated by the constellation sequence generator 106. As seen from these Figures, the auto-correlation of sequence PNI(n) and PNQ(n) generated by the sequence code generator 106 is similar to that of the reference sequence, indicating that bits PNI(n) and PNQ(n) are random.

FIGS. 7A and 7B respectively illustrate the cross-correlation and the Fourier transform of a sequence of random bits PNI(n) and PNQ(n) generated by the constellation sequence generator 106. As seen from FIGS. 7A and 7B, bits PNI(n) and PNQ(n) are random and not correlated with each other.

Figure 8:
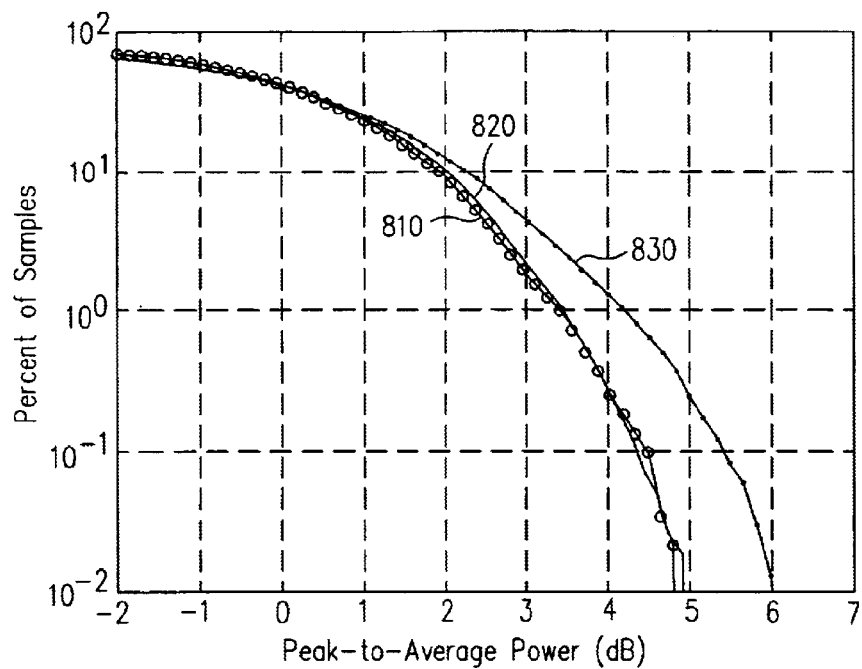
FIG. 8 illustrates for the same percent of samples, the peak-to-average power ratios of both the reverse link modulator of the present invention and of the reverse link modulator of the IS-2000 standard, as known in the prior art.

FIG. 8 shows the ratio of the envelope of the peak-to-average power in Decibels (dB) of a sequence 810 of random bits PNI(n) and PNQ(n), generated by constellation sequence generator 106, after the sequence is modulated by Walsh code and filtered by the IS-95A pulse shaping filters (see "*Mobile Station-Base Station Compatibility Standard for Dual-Mode Wideband Spread Spectrum Cellular Systems, TR*45, *TIA/EIA*-95, Nov. 18, 1997). Also shown in FIG. 8 are the ratios of envelope of the peak-to-average power in dB of a sequence 820 obtained using IS-95C standard (also known as IS-2000, see *Physical Layer Standard for CDMA* 2000 *Spread Spectrum Systems, TR*45, *PN*-4429, To be published as *IS*-2000.2, July 1999) as well as of a sequence 830 obtained using random sampling.

As seen from FIG. 8, at 0.1 percent of samples (i.e., the y-axis is at 0.1), which is defined as the percent of the sample points which cross the envelope, the ratio of the peak-to-average power of sequence 810 is higher than that of sequence 820 by 0.2 dB and is smaller than that of sequence 830 by 0.8 dB. Therefore, the reverse link modulator 100, in accordance with the present invention, achieves substantially the same peak-to-average power as those of the IS-2000 standard.

FIG. 9 shows a logic block diagram of state machine 900 whose state transition diagram is shown in FIG. 3. State machine 900 represents one embodiment of constellation sequence generator 106, shown in FIG. 2. State machine 900 includes flip-flops 902, 904, exclusive-OR gates 906, 908 and clock generator circuit 910.

As seen from FIG. 9, state machine 900 receives input signals LC(n) and signal CLOCK and, in response, generates signals PNI(n) and PNQ(n). Signal LC(n) is supplied by long code generator 104, as discussed above. The signal to the clock input terminal, CLK, of flip-flops 902 and 904 is supplied by clock generator circuit 910. Clock generator circuit 910 is an AND gate, which transfers signal LC(n) from its input terminal to its output terminal whenever signal CLOCK is at a high level.

Output signals PNI(n) and PNQ(n) are respectively generated at the output terminals OUT of flip-flops 902 and 904.

Exclusive-OR gate 906 has two input terminals I0 and I1. Input terminals I1 and I0 of exclusive-OR gate 906 respectively receive signals LC(n) and the output signal of flip-flop 902. The output signal generated by exclusive-OR gate 906 is applied to the input terminal IN of flip-flop 904. Exclusive-OR gate 908 also has two input terminals I0 and I1. Input terminal I1 of exclusive-OR gate 908 receives and inverts signal LC(n). Input terminal I0 of exclusive-OR gate 908 receives the output signal generated by flip-flop 904. The output signal generated by exclusive-OR gate 908 is applied to the input terminal IN of flip-flop 902.

With each occurrence of the CLOCK signal, if signal LC(n) is at a high level, a new low-to-high transition occurs at the clock input terminals CLK of flip-flops 902 and 904. When a low-to-high transition occurs on the CLK input terminals of flip-flops 902 and 904, the data present at the input terminals IN of these two flip-flops is transferred to their respective output terminals OUT, changing both PNI(n) and PNQ(n) bits.

The changes in the PNI(n) and PNQ(n) bits affect the output signals of exclusive-OR gates 906 and 908 which thereby change the input signals to flip-flops 902 and 904 respectively appear at PNI(n) and PNQ(n) when another low-to-high transition on signal CLOCK occurs. The state transition diagram of state machine 900 is shown in FIG. 3.

Clock generator 910 receives clock signal CLOCK at its input terminal CLK and long-code signal LC(n) at its input terminal EN and generates output signal O. Output signal O changes when there is a change in signal LC(n).

The exemplary embodiments of the above invention are illustrative and not limitative. The invention is not limited by the state transition diagram of the random sequence generator; nor is the invention limited by the particular state machine that generates the random sequence. Further modifications are obvious to those skilled in the art and are intended to fall within the scope of the appended Claims.

We claim:

1. A reverse link modulator comprising a constellation sequence generator for receiving at an input terminal a sequence of random bits and for generating a sequence of a pair of random bits; wherein for each received random bit only one bit of the generated pair of random bits change;

a long code mask containing data for identifying a wireless device comprising the reverse link modulator; and a long code generator coupled to the long code mask and for receiving the data contained in the long code mask, wherein the long code generator generates and supplies the sequence of random bits to the constellation sequence generator;

a multiplier coupled to the constellation sequence generator, the multiplier receiving and multiplying unmodulated pair of binary data by the pair of random bits generated by the constellation sequence generator for generating a pair of modulated data; and pulse shaping filters coupled to the multiplier, the pulse shaping filters receiving and low pass filtering the modulated data supplied by the multiplier, wherein the constellation sequence generator is a state machine, and the state machine comprises a pair of flip-flops and a pair of exclusive OR gates.

2. The reverse link modulator of claim 1 wherein the constellation sequence generator is a two-bit state machine.

3. The reverse link modulator of claim 2 wherein the state machine has four states.

4. The reverse link modulator of claim 2 wherein the states of the state machine are the generated pairs of random bits.

5. The reverse link modulator of claim 1 wherein the data contained in the long code mask is a 42-bit wide data.

6. The reverse link modulator of claim 1 wherein the sequence of random bits and a clock signal are ANDed and the supplied to clock input terminals of the pair of flip-flops.

7. The reverse link modulator of claim 6 wherein output signals of the flip-flops are the pair of random bits.

8. A method of modulating data in a reverse link modulator comprising:

receiving a pair of incoming data bits;

generating a pair of modulating random bits in response to a received random bit, wherein in response to receipt of each random bit only one of the bits in the randomly generated pair of modulating bits changes; and complex multiplying each bit of the received data by a different one of the pair of random bits to generate a pair of modulated data, wherein the generating art includes generating a pair of random bits with a two-bit state machine, and further wherein the state machine includes a pair of flip-flops and a pair of exclusive-OR gates.

9. The method of claim 8 wherein the generating act includes generating a pair of random bits with the two-bit state machine, the states of which comprises the generated pairs of random bits.

10. The method of claim 9 wherein the state machine has four states.

11. The method of claim 8 wherein the received random bit is supplied by a long code generator.

12. The method of claim 11 further comprising supplying data to the long code generator for thereby supplying the random bits.

13. The method of claim 8 further comprising pulse shape filtering the pair of modulated data bits.

14. A method of modulating data in a reverse link modulator comprising:

receiving a pair of incoming data bits;

generating a pair of modulating random bits in response to a received random bit, wherein in response to receipt of each random bit only one of the bits in the randomly generated pair of modulating bits changes;

complex multiplying each bit of the received data by a different one of the pair of random bits to generate a pair of modulated data, wherein the generating act includes generating a pair of random bits with a two-bit state machine, the states of which comprises the generated pairs of random bits, and wherein the state machine has four states, and wherein the received random bit is supplied by a long code generator; supplying data to the long code generator for thereby supplying the random bits; and further comprising ANDing the sequence of random bits and a clock signal and applying the ANDed signal to clock input terminals of the pair of flip-flops.

15. The method of claim 14 wherein output signals of the flip-flops are the pair of random bits.

* * * * *

UNITED STATES PATENT AND TRADEMARK OFFICE
CERTIFICATE OF CORRECTION

PATENT NO. : 6,788,728 B1
DATED : September 7, 2004
INVENTOR(S) : Mohit K. Prasad et al.

It is certified that error appears in the above-identified patent and that said Letters Patent is hereby corrected as shown below:

Column 3,
Line 51, change "If while is" to -- If while in --.

Column 5,
Line 22, after last word "904", insert -- . -- followed by the following -- The new input signals to flip-flops 902 and 904 --.

Column 6,
Line 10, before "supplied", change "the" to -- then --.

Signed and Sealed this

Twenty-second Day of March, 2005

JON W. DUDAS
*Director of the United States Patent and Trademark Office*